SEISMIC PROSPECTING

Original Filed Nov. 20, 1953 2 Sheets-Sheet 1

United States Patent Office

Re. 25,902
Reissued Nov. 9, 1965

25,902
SEISMIC PROSPECTING

Burton D. Lee, Houston, Tex., assignor to Texaco Inc., New York, N.Y., a corporation of Delaware Original No. 2,871,461, dated Jan. 27, 1959, Ser. No. 393,433, Nov. 20, 1953. Application for reissue Nov. 27, 1959, Ser. No. 6,089
15 Claims. (Cl. 181—.5)

Matter enclosed in heavy brackets [ ] appears in the original patent but forms no part of this reissue specification; matter printed in italics indicates the additions made by reissue.

This invention relates to seismic prospecting and more particularly to improved methods of and means for electrically combining the signals produced by a number of geophones to produce a single, more-intelligible signal.

As known in the prior art such as that exemplified by U.S. Patent 2,638,402 which issued to me in May 1953, and is assigned to the assignee hereof, certain advantages may be derived by combining a number of geophone signals, e.g., a new signal may be obtained which has a higher signal-to-noise ratio.

The object of the present invention is to provide new and more useful methods of and means for combining geophone signals.

In general this and other objects are achieved by a method of combining which is more akin to multiplication than addition and thereby affords much greater increases in signal-to-noise *ratio* and is distinguishable from true algebraic multiplication in that it does not cause frequency doubling by producing positive-going voltage excursions from pairs of negative-going voltage excursions as well as from pairs of positive-going excursions. The feature of producing a resultant wave having the same frequency as that of the original waves will be important to geophysicists who, in interpreting seismic records, have become accustomed to seek for certain familiar, characteristic wave forms which they might not readily recognize if they have been seriously modified. It is even more important that identity of phase of reflected waves be preserved as an aid in trace-to-trace and record-to-record correlation as will be shown below in discussing certain figures of the drawing.

Figure 1:
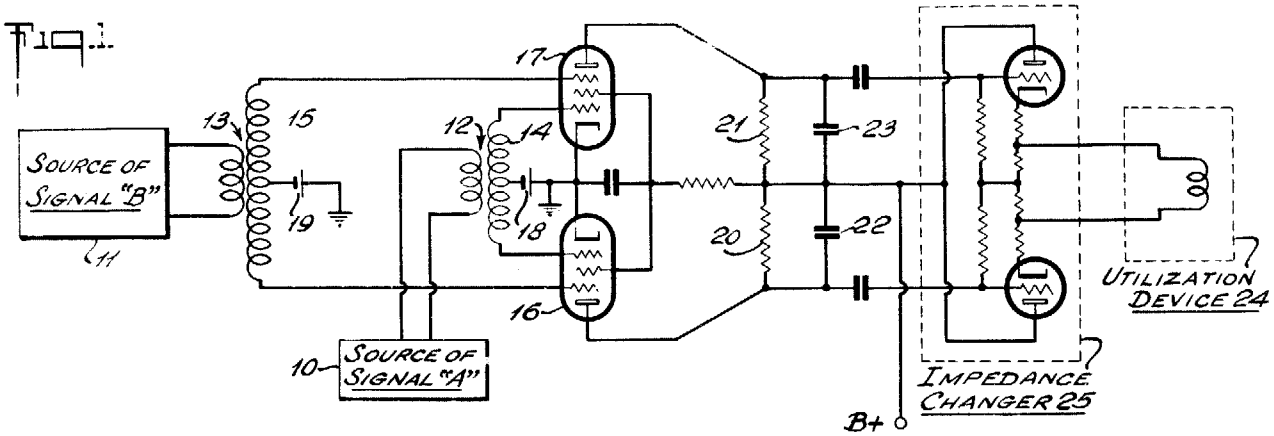
FIG. 1 is a circuit diagram representing a preferred embodiment of the invention.

Two signal sources 10 and 11 shown in FIG. 1 may in practice be a pair of geophones employed in spaced-apart relationship in a seismic prospecting operation and provided with conventional amplifying equipment. If desired the signal sources may comprise apparatus for "playing back" recordings of the output of a pair of geophones and at least one of them may comprise a means for shifting the phase of the signal which it reproduces with respect to that of the signal reproduced by the other, e.g., a movable magnetic pick-up head. Each of the signals A and B is fed to a respective phase-splitting transformer (12, 13) having a secondary (14, 15) whose center tap is grounded. Because of this arrangement any excursion of either input signal, whether it be positive-going or negative-going will produce two excursions which go in opposite directions. Each of the two pairs of corresponding output ends of the secondaries are connected to a respective tube (16, 17) with each output end of each pair connected to a different input electrode thereof, all of the input electrodes in question being normally biased to cut off by the use of appropriate biasing means such as batteries (18, 19) respectively connected serially between the center taps and ground. The tubes 16, 17 may be any of a variety of suitable kinds, such as "gated-beam" tubes (6BN6's) which are characterized by the fact that they will amplify a signal which is fed to an input electrode to an extent which is determined by the potential of another electrode which may also serve as an input electrode. Because of this if two varying signals are simultaneously applied to two respective electrodes of such a tube the instantaneous voltages of each will be amplified in accordance with corresponding instantaneous voltages of the other thereby producing an output which is proportional to their product.

I make use of the above-described characteristic in the special way disclosed herein for reasons which will be best understood from consideration of the fact that if a tube of the kind in question be used in a completely class A type of operation the results which are desirable for my purposes would not be obtained since it would be operative regardless of the relative phases of the intelligence waves comprised in the signals. Because of this in all preferred embodiments of the present invention the three following features are employed in combinations like that of FIG. 1: a pair of phase splitters for push-pull feeding of the two respective signals; a pair of "multiplier" tubes; and class B operation for the tubes. In addition they also preferably employ a push-pull output to avoid frequency doubling, e.g., as shown in FIG. 1 the load impedances (20, 21) of the two tubes may be commoned on their B+ sides with the output being derived from across both of them. On the other hand if it should for any reason be deemed unnecessary and/or undesirable to avoid frequency changing, the anodes of the two tubes 16, 17 may be connected to B+ over a common load impedance, the output then being derived between the juncture of the anodes and ground.

Figure 4A:
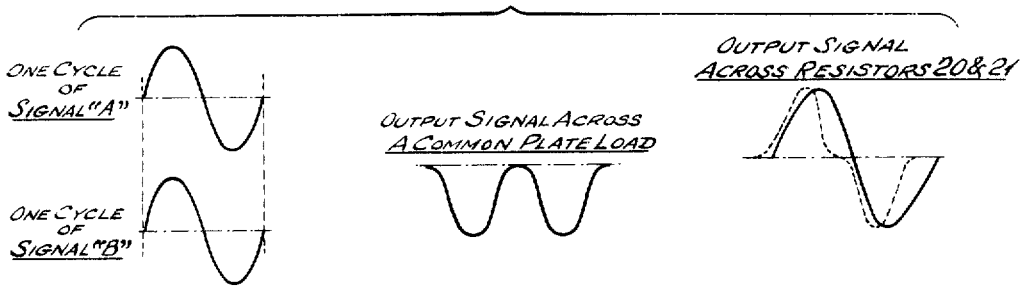
FIGS. 4a, 4b and 5 represent families of wave forms illustrating the operation of the FIG. 1 apparatus.
Figure 4B:
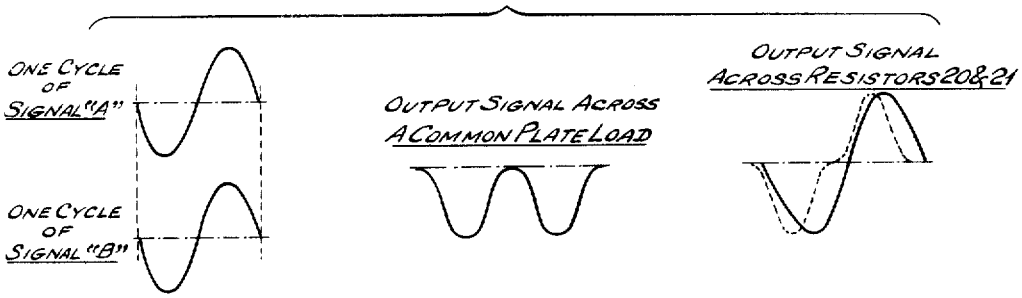

Referring now to FIGS. 4a and 4b it will be seen that when the FIG. 1 apparatus is provided with a push-pull output, it is capable of preserving the phase as well as the frequency of the signals which it combines whereas it is not capable of either when its two tubes are provided with a common load impedance.

Inspection of the wave forms of FIGURES 4a and 4b reveals that the insertion of signals A and B, which are initially positive going waves, into the multiplier produces a wave form illustrated at the center of FIGURE 4a. Likewise, insertion of the signals A and B of FIGURE 4b, which are initially negative going waves, produce the wave form shown in the center of FIGURE 4b. Comparison of the wave forms in the center of FIGURES 4a and 4b reveals them to be identical and thus to have introduced an ambiguity in correlation since it would be natural to correlate the first trough of FIGURE 4a center with the first trough of FIGURE 4b center. Looking back at the original input signals, it is obvious that if any correlation exists between the two groups of signals, the correlation must be either between the two positive going cycles of FIGURE 4a and the two positive going cycles of FIGURE 4b, or the two negative going cycles of FIGURE 4a with the two negative going cycles of FIGURE 4b. In order to eliminate the possibility of this ambiguity, the apparatus of this invention has been modified to produce wave forms as illustrated in FIGURES 4a and 4b right, wherein phase identity of the signals has been preserved.

The dotted-line wave forms shown in FIGS. 4a and 4b show how distortion is incurred in the transmission of the signals A and B through the tubes 16, 17 by phase-reversal of the output wave form of the multiplier resulting from positive-going portions of the input signals A and B. A good part of this distortion can be climinated by shunting the load inpedances 20, 21 with condensers (22, 23) which are large enough to by-pass the high frequency components of the distorted waves, e.g., harmonics, but not large enough to excessively affect either the phase or the amplitude of the desired [signal] *signals*, i.e., the fundamental.

Since the galvanometers which I use as output signal utilization devices (see 24 in FIG. 1) have relatively low input impedances, I employ balanced impedance-translating circuits (see 25 in FIG. 1) to couple them to the outputs of the signal combining circuits. Since the circuit 25 shown herein merely comprises a push-pull connected pair of conventional cathode followers and therefore will be readily understood by those familiar with the art and since its circuit details do not constitute part of the present invention and are not being claimed per se, it is believed unnecessary to describe it in any further detail herein.

Figure 5:
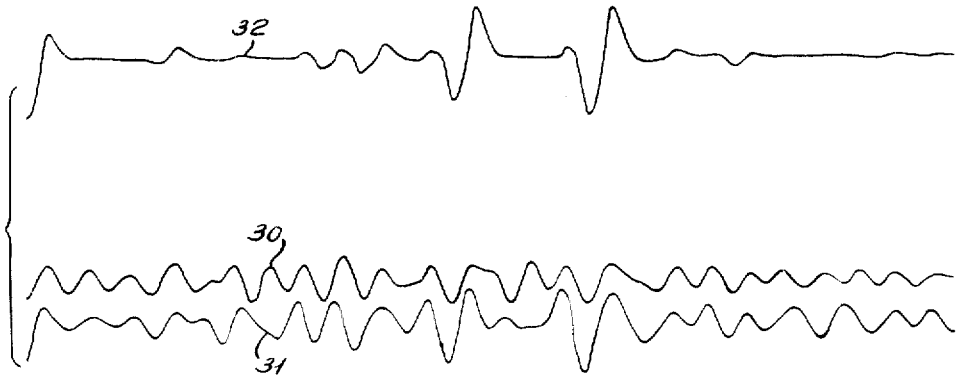

The effectiveness of this invention in improving the signal-to-noise ratio of geophone signals will be readily understood by reference to the family of voltage wave forms shown in FIG. 5 in which the waves 30 and 31 represent actual geophone signals produced by a pair of spaced-apart geophones and the wave 32 represents an output signal produced by combining the waves 30 and 31 in the apparatus of FIG. 1 in accordance with the present invention.

Figure 3:
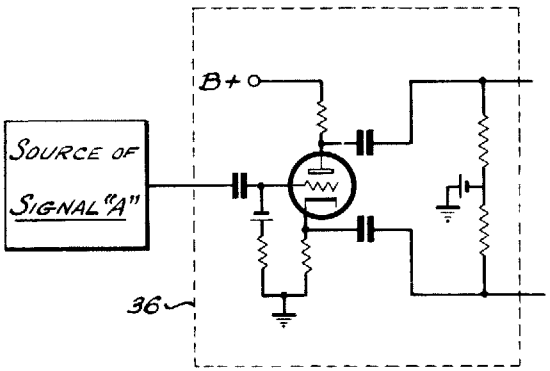
FIGS. 2 and 3 are circuit diagrams of modified portions of the embodiment of FIG. 1 suitable for substitution therein.
Figure 2:
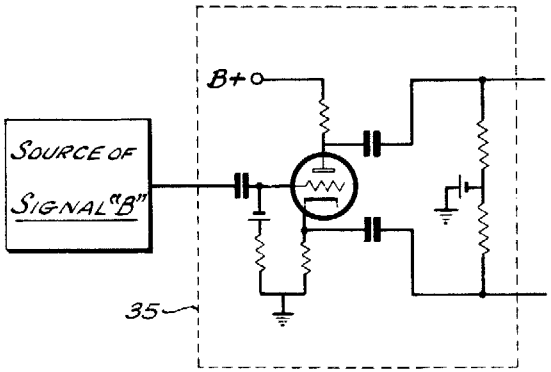

Referring to FIGS. 2 and 3 each of the blocks 35 and 36 contains a conventional phase inverter circuit which, if desired, may be used in place of one of the phase-splitting transformers 12, 13. As in the case of the impedance changer 25 the particular circuit details of the blocks 35, 36 will not be described in detail since they are conventional rather than characteristic of this invention.

Obviously, many modifications and variations of the invention as hereinbefore set forth may be made without departing from the spirit and scope thereof and therefore only such limitations should be imposed as are indicated in the appended claims.

I claim:

1. Electrical apparatus for combining a plurality of signals to provide an output that is proportional to the product of their instantaneous values during input signal excursions of like polarity comprising a pair of amplifying devices each having at least two signal inputs and the characteristic of affording for a signal applied to one of said inputs a gain which is variable in accordance with variations in the potential of the other input; a phase splitter for receiving a first signal and applying it to each of a pair of said inputs in a different one of said devices in respectively opposite phase; another phase splitter for receiving a second signal and applying it to each of the remaining pair of said inputs in respectively opposite phase; and means for biasing each of said inputs substantially to cut-off in the absence of an applied signal, and output means for said devices.

2. Apparatus as in claim 1 in which said output means comprises a push-pull output circuit for the two devices whereby the polarity of the signal output corresponds to that of the input signals.

3. Apparatus as in claim 1 which further comprises two geophones each connected to a respective one of said phase splitters.

4. Apparatus as in claim 1 which further comprises recordings of the signal outputs of two geophones, means for reproducing each of the recordings and feeding the reproduced output to a respective one of said phase splitters, and means for adjusting the relative phase of the reproduced outputs before feeding them to the phase splitters.

5. Apparatus as in claim 4 in which each of said devices includes an output electrode and which further comprises a recording utilization device connected to said output electrodes.

6. Apparatus as in claim 5 in which said utilization device comprises a galvanometer and which further comprises an impedance-lowering circuit connected between said output electrodes and the input of said galvanometer.

7. Apparatus as in claim 6 which further comprises a push-pull output for the two devices and in which said impedance lowering circuit includes a push-pull connected pair of cathode followers.

8. Apparatus for combining two electrical signals to provide an output whose magnitude is proportional to the product of the instantaneous values of said signals during intervals when said signals are of the same polarity and which output otherwise corresponds substantially to zero comprising a pair of amplifying devices each having two electrodes normally biased substantially to cut-off and an output electrode; a signal-receiving transformer including a secondary having a center tap which is grounded and two oppositely-off-center points each of which is connected to one of said input electrodes in a different one of said devices; another signal receiving transformer including a secondary having a center tap which also is grounded and two oppositely-off-center points each of which is connected to a respective one of the input electrodes not connected to the first-mentioned secondary; a circuit for applying energizing electrical energy to said output electrodes from a common point over respective load impedances; and means for deriving an output signal from the apparatus across a circuit comprising both of said impedances in series, thereby to derive an output wave that retains the fundamental frequency characteristic of the combined signals.

9. Electrical apparatus for combining a plurality of electrical signals to provide an electrical output that is proportional to the product of the instantaneous values of said signals during intervals when said signals are of the same polarity comprising in combination first and second amplifier devices, each of said devices including a plurality of input circuits corresponding to the number of signals to be combined, each of said devices including an output circuit that is common to its respective input circuits, means for simultaneously applying each of said signals in phase opposition to an input circuit of said first and second devices respectively, means for biasing the input circuits of said two devices substantially to cut-off in the absence of an applied signal, output means for combining the outputs of said two devices in phase-opposition, thereby to derive an output wave that retains the phase identity of the combined signals.

10. Electrical apparatus for combining a pair of electrical signals to provide an electrical output that is proportional to the product of the instantaneous values of said signals during intervals when said signals are of the same polarity comprising in combination first and second amplifier devices, each of said devices including a pair of input circuits corresponding to the signals to be combined, each of said devices including an output circuit that is common to its respective input circuits, means for simultaneously applying each of said signals in phase opposition to an input circuit of said first and second devices respectively, means for biasing the input circuits of said two devices substantially to cut-off in the absence of an applied signal, output means for combining the outputs of said two devices in phase-opposition, thereby to derive an output wave that retains the phase identity of the combined signals.

11. Electrical apparatus for combining a plurality of electrical signals to provide an electrical output that is proportional to the product of the instantaneous values of said signals during intervals when said signals are of the same polarity comprising in combination first and second amplifier devices, each of said devices including an anode, a cathode, and a plurality of control electrodes corresponding to the number of signals to be combined, an output circuit for each of said devices including its respective anode and cathode, means for simultaneously applying each of said signals in phase opposition to a respective control electrode of both said first and second devices, means for biasing said control electrodes of said two devices substantially to cut-off in the absence of an applied signal, output means including the output circuits of said two devices for combining the outputs of said two devices in phase opposition, thereby to derive an output wave that retains the phase identity of the combining signals.

12. Electrical apparatus for combining a pair of electrical signals to provide an electrical output that is proportional to the product of the instantaneous values of said signals during intervals when said signals are of the same polarity comprising in combination first and second amplifier devices, each of said devices including an anode, a cathode, and a pair of control electrodes corresponding to the number of signals to be combined, an output circuit for each of said devices including its respective anode and cathode, means for simultaneously applying each of said signals in opposition to a respective control electrode of both said first and second devices, means for biasing said control electrodes of said two devices substantially to cut-off in the absence of an applied signal, output means including the output circuits of said two devices for combining the outputs of said two devices in phase opposition, thereby to derive an output wave that retains the phase identity of the combining signals.

13. The apparatus of claim 12 wherein the control characteristics of said two devices are adapted and arranged to provide zero output when the instantaneous values of the applied input signals are of different polarity.

*14. Seismic signal transforming apparatus comprising means to establish a first electrical signal which varies in amplitude in accordance with vibrations received by a seismometer; means to establish a second electrical signal which varies in amplitude in accordance with vibrations received by a seismometer; means energized by said first signal to establish third and fourth signals which*

*are representative of the positive and negative portions of said first signal; means energized by said second signal to establish fifth and sixth signals which are representative of the positive and negative portions of said second signal; means to multiply said third and fifth signals to establish a seventh signal; means to multiply said fourth and sixth signals to establish an eighth signal; and means to subtract said eighth signal from said seventh signal.*

*15. Apparatus for combining two electrical signals which vary in amplitude each in accordance with vibrations received by a seismometer; means energized by each of said electrical signals to establish a pair of signals which are representative of the positive and negative portions respectively of each said electrical signal; means to multiply said positive portions by one another; means to multiply said negative portions by one another; and means to subtract the output of said negative portions multiplying means from the output of said positive portions multiplying means.*

References Cited by the Examiner

The following references, cited by the Examiner, are of record in the patented file of this patent or the original patent.

UNITED STATES PATENTS

| | | | |
|---|---|---|---|
| 2,477,074 | 7/49 | McIntosh | 179—171 |
| 2,498,871 | 2/50 | Beard et al. | 250—27 |
| 2,509,651 | 5/50 | Olson | 340—15 |
| 2,531,458 | 11/50 | Nye | 179—171 |
| 2,597,886 | 5/52 | McCoy | 250—27 |
| 2,631,279 | 3/53 | Bollinger et al. | 250—27 |
| 2,638,402 | 5/53 | Lee | 340—15 |
| 2,661,464 | 12/53 | Wolf | 340—15 |
| 2,662,126 | 12/53 | Henson | 340—15 |
| 2,888,089 | 5/59 | Piety | 181—0.5 |

BENJAMIN A. BORCHELT, *Primary Examiner.*

CHESTER, L. JUSTUS, CARL W. ROBINSON, *Examiners.*